March 29, 1949. A. GOLDSTEIN 2,465,682

MOVING CONTACT ELECTRIC CURRENT CONVERTER

Filed Aug. 7, 1947.

Inventor:
Alexander Goldstein,

By Pierce, Scheffler + Parker.
Attorneys.

Patented Mar. 29, 1949

2,465,682

UNITED STATES PATENT OFFICE 2,465,682

MOVING CONTACT ELECTRIC CURRENT CONVERTER

Alexander Goldstein, Wettingen, Switzerland, assignor to Aktiengesellschaft Brown, Boveri & Cie., Baden, Switzerland Application August 7, 1947, Serial No. 767,223
In Switzerland March 31, 1942

Section 1, Public Law 690, August 8, 1946
Patent expires March 31, 1962

11 Claims. (Cl. 315—137)

The invention concerns an arrangement for the sparkless interruption of a multi-phase circuit which is switched by means of contacts which are periodically and mechanically actuated, for instance by means of a mechanical contact electric current rectifier, there being a grid-controlled electron discharge vessel in series with an auxiliary voltage source arranged in parallel with the contact. According to the invention choking coils are arranged in the leads to the contacts, these coils being highly saturated at relatively low currents, and means are also provided which control the discharge vessel in dependence on the voltage changes in the choking coils during the commutation process when passing from one phase to the next.

Figure 1:
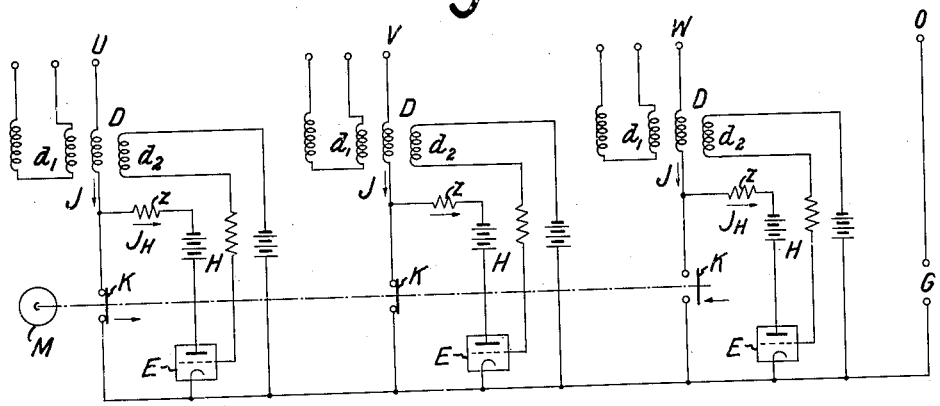
Figure 2:
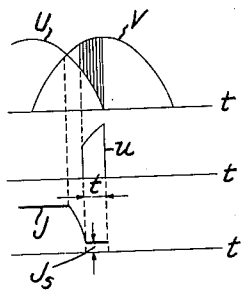
Figure 3:
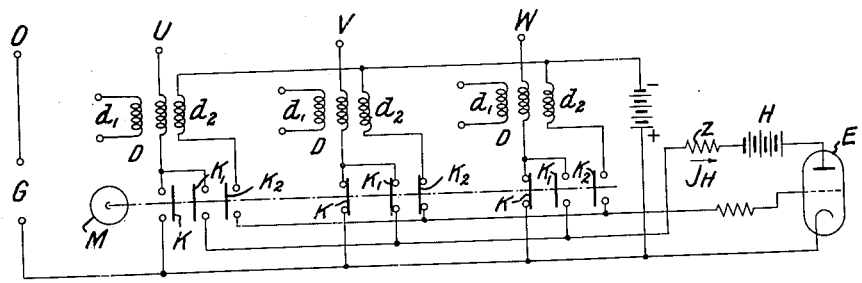

In the accompanying drawing, Fig. 1 is a circuit diagram of a current converter embodying the invention; Fig. 2 is a curve sheet showing the voltage and current characteristics during commutation, and Fig. 3 is a circuit diagram of another embodiment.

In Fig. 1, UVW are the phase conductors of a three-phase network from which with the aid of a transformer not shown in the drawing and a moving contact current rectifier K, the direct current supply network G is fed. The contacts of the various phases of the converter K are periodically opened and closed by the synchronous motor M with a frequency corresponding to that of the three-phase network. Choking coils D which are already highly saturated at relatively low currents are located in the phase leads to the contacts K. These coils are preferably provided with a premagnetising winding $d_1$, which can be fed with direct or alternating current. The contacts K of the current converter are bridged over by a parallel circuit in which there is a grid-controlled electron discharge vessel E with a vapour or gas discharge path in series with an auxiliary voltage source H. During the time the commutation process between the successive phases is in progress, the vessel E is controlled by the voltage changes in the choking coils. For this purpose the choking coils D are provided with a secondary winding $d_2$ which supplies the control voltage for the grids of the discharge vessels E. The grid control circuit also contains a source of bias voltage and a grid resistance. In the circuit parallel to the contacts K and containing the discharge vessel E and the auxiliary voltage source H there is an impedance Z which is so dimensioned that the current flowing in this parallel circuit is suited to the current flowing over the choking coil and the contact. Impedance Z can for instance consist of two parallel branches each containing a resistance, whilst one of these branches also contains a condenser.

The commutating process for the arrangement shown in Fig. 1 is now explained by means of the diagrams of Fig. 2.

When the voltage of phase V commences to exceed the voltage of phase U, the contact K associated with phase V is closed. The current of phase U decreases and that of phase V increases until the current J of phase U has become so small that the core of choking coil D reaches the unsaturated region, and the current is maintained at the small value $J_s$. Choking coil D is so premagnetised that the current $J_s$ has the same sign as the previous charge current of the phase U, so that the current of phase U only reverses at the end of the period $t$ of the commutating process. This is of paramount importance for the extinction of the discharge vessel E.

The voltage drop across the choking coil D is normally negligible but, during the period $t$, see Fig. 2, when the mechanical switch contacts K of phases U and V are both closed, a voltage is set up across the choking coil D of phase U which is substantially equal to the difference in voltage of the phases V—U, this rise in voltage at the choking coil occurring very suddenly. This voltage impulse is transmitted positively to the negative biassed grid of the discharge vessel E through the secondary winding $d_2$, whereupon the latter is made current conductive. The auxiliary voltage H and the impedance Z are so adjusted to the ignition voltage of the discharge vessel that a space current $J_H = J_s$ flows through the latter in the same sense as in the choking coil D. Contact K of phase U thus becomes free of current and can be opened. Upon the opening of the contact K of phase U, the path of the small value current $J_s$ of phase U is from terminal U through choke D of phase U, impedance Z, auxiliary voltage source H and discharge vessel E of phase U, contact K of phase V, choke D of phase V, terminal V, and the alternating current source, not shown. After the opening of contact K of phase U, the current $J_s$ through choke D of phase U continues to flow so long as it has the same direction as the preceding load current of phase U. When the current $J_s$ falls to zero at the end of the low current interval, conduction through the discharge vessel E of phase U is extinguished. During the period $t$ after the contact has opened, the blocking voltage on the contact K of phase U remains approximately zero, because the parallel circuit is tuned in such a manner that with a current $J_s$ there is no voltage at the ends of this circuit. The necessary conditions for good commutation with a mechanical contact type of converter, namely a low switching current and a small blocking voltage on the opening contact, are thus fulfilled by the described arrangement.

At the end of the period $t$, the phase current $J$ passes through zero and changes its sign. This causes the arc in the discharge vessel to extinguish, and due to the negative bias voltage on the grid it will remain non-conductive up to the next commutation process. If the instant for the opening of the contacts K during the commutation period $t$ is correctly chosen, then when the discharge vessel is extinguished the contacts will already be so far apart that a back-arc is impossible.

The impedance Z must have such a value that the course of the current in the parallel circuit is as far as possible matched with the current $J_s$. This can be achieved by a suitable combination of resistance and capacitance for the impedance Z. The auxiliary voltage source H must be free from induction, because the current flowing in the parallel circuit should attain the instantaneous value $J_s$ as rapidly as possible when ignition occurs. If the auxiliary voltage source is not free from induction, then a condenser must be arranged in parallel with the voltage source. As shown in Fig. 3, a single parallel circuit may be used with the several phases to reduce the number of discharge vessels and auxiliary voltage sources. The discharge vessel E is connected in turn across the switches K of the several phases just prior to the low current interval of the phase which is momentarily supplying current to the direct current circuit G. The cathode of the discharge vessel E is connected to direct current terminals of the several switches K, and sets of switch blades $K_1$ and $K_2$ of the several phases are synchronously actuated by the motor M to complete the anode circuit of discharge vessel E across the switch K of the current-supplying phase and to complete the grid circuit through the secondary winding $d_2$ of the choke coil of that phase. The change-over takes place during intervals when the discharge vessel is blocked.

The method of operation is identical with that of the Fig. 1 rectifier system in which each phase has an individual parallel circuit. With the switches as shown in Fig. 3, the parallel circuit is connected to phase V, the switch K of phase W has just closed and the switch K of phase V is about to open during the low current interval.

I claim:

1. Arrangement for the sparkless interruption of a multiple-phase circuit, which is switched by contacts that are mechanically and periodically actuated, for instance by means of a mechanical contact current converter, and where parallel to said contacts a grid-controlled electron discharge vessel is arranged in series with an auxiliary voltage source, characterised by the feature that in the leads to the contacts of the individual phases choking coils are located which are highly saturated at relatively low currents, means also being provided to initiate conduction through the discharge vessel prior to the opening of the contacts of the phase and in dependence on the voltage changes at the choking coil of that phase during the commutating process when passing from one phase to the next.

2. Arrangement as in claim 1, characterized by the feature that said conduction-initiating means comprises, for each choking coil, a secondary winding which supplies the control voltage for the grid of the associated discharge vessel.

3. Arrangement as in claim 1, characterised by the feature that the choking coils are premagnetized with direct current.

4. Arrangement as in claim 3, characterised by the feature that the choking coils are so premagnetized that the current which flows through them from the phase which is being relieved only changes its sign at the end of the commutating period, whereby the discharge vessel of said phase is blocked.

5. Arrangement as in claim 1, characterised by the feature that the choking coils are premagnetized with alternating current.

6. Arrangement as in claim 5, characterised by the feature that the choking coils are so premagnetized that the current which flows through them from the phase which is being relieved only changes its sign at the end of the commutating period, whereby the discharge vessel of said phase is blocked.

7. Arrangement as in claim 1, characterised by the feature that in the parallel circuit containing the discharge vessel and the auxiliary voltage an impedance is located.

8. Arrangement as in claim 7, characterised by the feature that the impedance is so dimensioned that the current flowing through the parallel circuit is suited to the current flowing over the choking coil.

9. Arrangement as in claim 1, characterised by the feature that a common parallel circuit including a single discharge vessel is provided for several phases.

10. Arrangement as in claim 9, characterised by the feature that the parallel circuit is successively connected with different phases.

11. Arrangement as in claim 10, characterised by the feature that the parallel circuit is connected to the individual phases by means of a synchronous switch which is actuated when said parallel circuit carries no current.

ALEXANDER GOLDSTEIN.

REFERENCES CITED

The following references are of record in the file of this patent:

UNITED STATES PATENTS

| Number | Name | Date |
| --- | --- | --- |
| 1,681,196 | Rudenberg | Aug. 21, 1928 |
| 1,690,524 | Berthold | Nov. 6, 1928 |
| 1,902,958 | Jackson | Mar. 28, 1933 |
| 2,157,925 | Stoddard | May 9, 1939 |
| 2,215,804 | West | Sept. 24, 1940 |